July 11, 1967 H. I. JOHNSON ET AL 3,330,052
SUBGRAVITY SIMULATOR
Filed Aug. 16, 1965 7 Sheets-Sheet 2

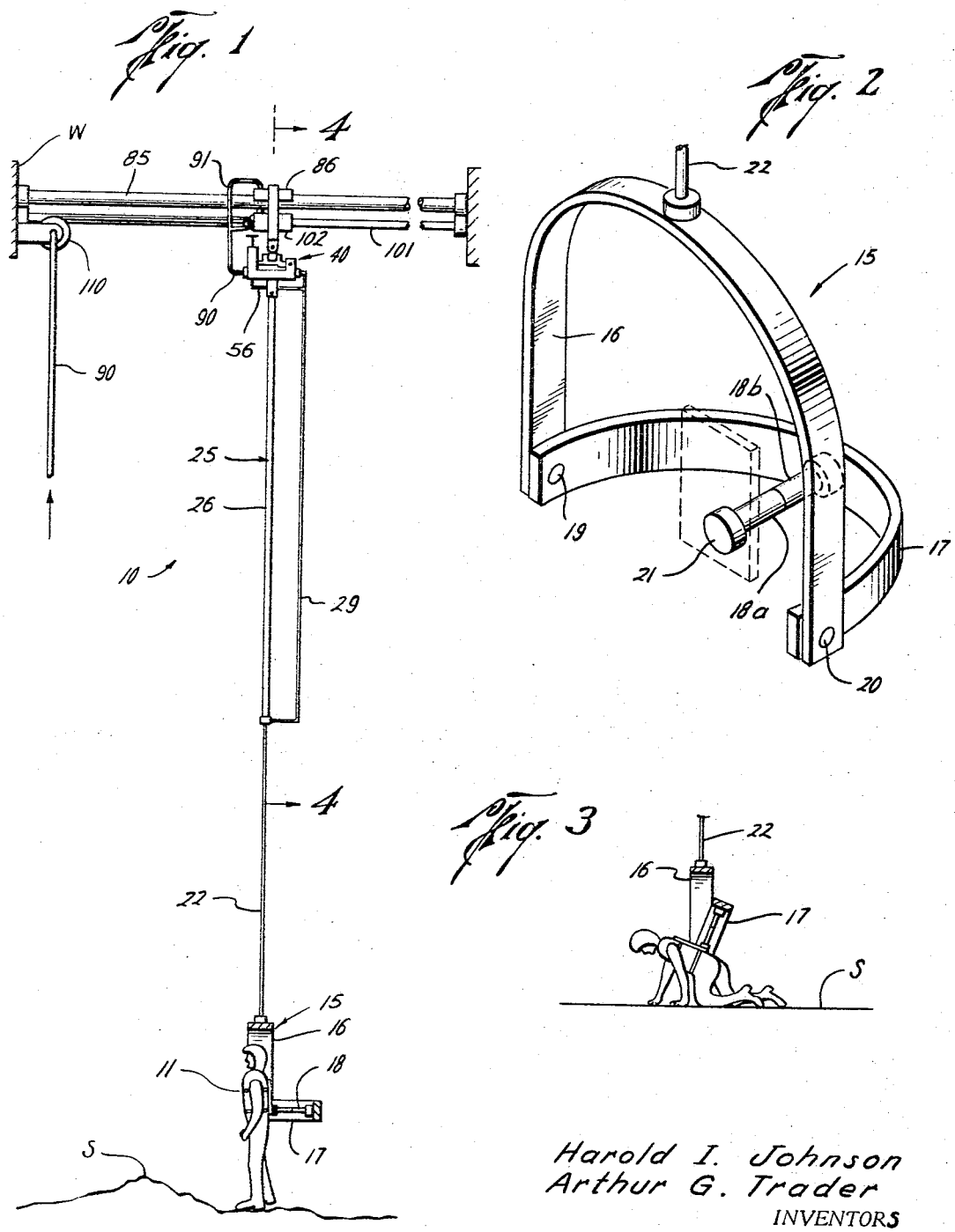
Harold I. Johnson
Arthur G. Trader
INVENTORS

Harold I. Johnson
Arthur G. Trader
INVENTORS

BY
*[signatures]*
ATTORNEYS

July 11, 1967

H. I. JOHNSON ET AL 3,330,052

SUBGRAVITY SIMULATOR

Filed Aug. 16, 1965

Harold I. Johnson
Arthur G. Trader
INVENTORS

BY
ATTORNEYS

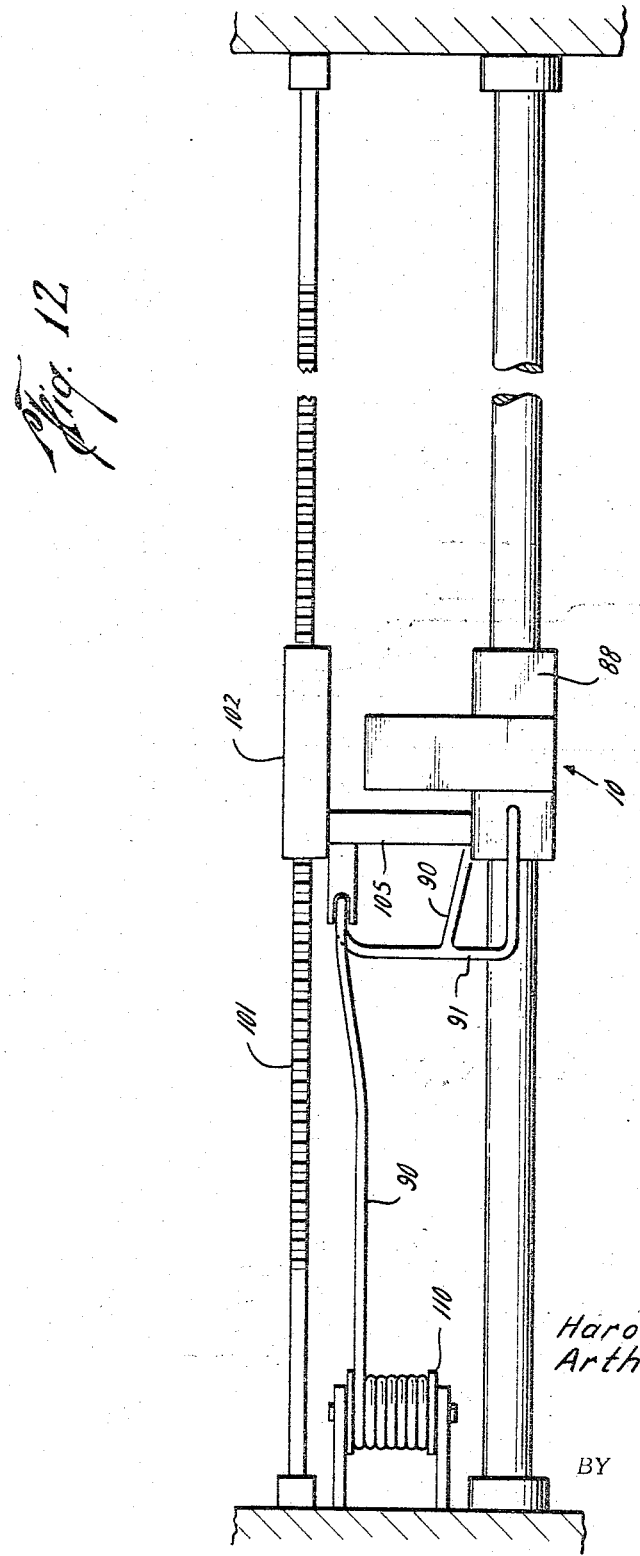

United States Patent Office 3,330,052
Patented July 11, 1967

3,330,052
SUBGRAVITY SIMULATOR
Harold I. Johnson, Seabrook, and Arthur G. Trader, Houston, Tex., assignors to the United States of America as represented by the Administrator of the National Aeronautics and Space Administration
Filed Aug. 16, 1965, Ser. No. 480,210
16 Claims. (Cl. 35—12)

The invention described herein may be manufactured and used by or for the Government of the United States of America for governmental purposes without the payment of any royalty thereon or therefor.

This invention relates to a partial gravity simulator and more particularly to an apparatus for training personnel to perform under partial gravity conditions.

When a manned landing is effected on the lunar surface it is expected that the astronaut crew will leave their space vehicle for the purpose of exploring the surface, making scientific measurements, and preparing the space vehicle for the return flight. Because the lunar environment is considerably different from that of earth, it is important that the astronaut crew learn to adjust to conditions similar to those which are expected to be encountered. The most significant environmental differences will be the vacuum environment and the low lunar gravitational field which is approximately one-sixth that of the earth's gravity. The crew will also have to learn how to walk and to perform tasks in this environment while being encumbered by pressurized space suits, each of which is equipped with a life support system to be carried by the astronaut, and with other means to provide protection from the vacuum environment and such hazards as temperature extremes, solar radiation showers, meteorites, and possibly a very rugged terrain.

It is the general purpose of this invention to provide an apparatus which is suitable for training astronaut crews to perform on a simulated lunar surface under the conditions of lunar gravity. A variety of devices and techniques heretofore have been developed for simulating subgravity and zero-gravity conditions. One method which has been used involves the use of an airplane flying a Keplerian trajectory. The disadvantage of this method, however, is the limited duration of the simulation and the limited area in which the trainee may maneuver. It is also very difficult to retain a simulated lunar surface on the floor of the airplane at all times.

A device for simulating partial gravity has also been developed wherein a crewman trainee is placed on his side in a body sling arrangement sustained from a long cabling system, with the angle of the cable arranged in relation to a walkway so that five-sixths of the trainee's weight is on the cable and one-sixth is on his feet. This apparatus requires at least a 100 ft. tower to achieve the accuracy required for lunar gravity simulation, and because of its large dimensions the apparatus is difficult to house. Difficulties also arise from the fact that it is necessary to simulate the lunar surface at an angle of approximately 80° from the horizontal. Unless the simulated surface is glued together artificially, it is impossible to retain it at an angle of 80° from the horizontal.

Another prior art device consists of a large negator spring arrangement from which the trainee is suspended. Such springs, however, have so much friction that the simulation is very poor. Other partial gravity simulation devices comprise constant acceleration elevators, vertical linear accelerators, and the like, but in each of these devices the simulation of subgravity is only of few seconds duration with short periods of weightlessness alternating with periods of high accelerations. Since all of these devices depend on vertical fall to achieve simulation, almost any activity, including walking, is extremely difficult.

The partial gravity simulator of this invention which is designed to overcome the attendant disadvantages of the prior art methods and devices, comprises a gimballed body support system which suspends the trainee from one end of the piston of a vertically arranged pneumatic cylinder and piston assembly. Mounted atop the cylinder and piston assembly is a pneumatic servo mechanism which includes a spring balance scale suspended from an overhead monorail on an air bearing and which weighs the pneumatic piston and cylinder assembly from which the trainee is suspended. The scale beam is counterbalanced by a biasing spring. Through a twin valve arrangement the servo mechanism, as controlled by the pivotal position of the scale beam, meters the flow of compressed air into the cylinder to urge the piston to apply a constant uplifting force to the trainee, irrespective of the relative position of the cylinder and piston. For simulating lunar gravity, the uplifting force is always equal to five-sixths of the trainee's weight. Consequently, he exerts a force of only one-sixth "G" on a walking surface which is the expected magnitude of lunar gravitational force. The air is supplied to the cylinder at one side of the piston through one valve and exhausted from the cylinder through the other valve so as to maintain an invariant uplifting force, regardless of the movements of the trainee and their varying effect on the scale device.

The gimbal system which provides the trainee with three full degrees of freedom in attitudes is attached to the lower end of the piston rod of the pneumatic cylinder which, in turn, is rotatable within the cylinder. Two full translational degrees of freedom are provided by the monorail and the cylinder in the horizontal direction of the monorail and in the vertical direction, respectively, and a limited degree of freedom in translation is provided in the direction perpendicular to the monorail. The gimbal system comprises yaw and pitch gimbals consisting of half circle members pivotally joined at their diameter ends, and a roll gimbal in the form of an axially rotatable rigid rod which at one end is secured to a back plate strapped to the body of the trainee, and at its other end is journalled to the center of the arc defined by the pitch gimbal. The back plate is part of a harness assembly which supports the trainee while leaving his arms and legs free, and the attachment of the rod to the back plate is such that the rod extends through the trainee's center of gravity.

The pneumatic piston and cylinder assembly and the pneumatic servo mechanism are suspended by the spring scale arrangement which positions the twin valves to control the gas feed to the cylinder and the exhaust therefrom. By use of an adjustable bias spring for the scale, the lift of the simulator can be adjusted from zero lift to any lift desired within the design capability of the simulator, and can therefore simulate gravitational forces of zero "G" to gravitational forces equal to one "G."

The piston and cylinder assembly uses the gas pressure in the cylinder to make the piston an inside gas operated bearing by bleeding off a small amount of gas from the cylinder. Also, the bottom end of the cylinder which provides an exit for the piston rod is also a gas operated bearing which uses a small amount of gas from the cylinder. Consequently, friction between the piston and cylinder is substantially eliminated.

Since the simulator is gas operated, the large amounts of gas required are supplied from an off-board gas supply in order that the simulator may be used continuously. The gas is supplied by means of hoses to the pneumatic servo mechanism and the air bearing atop the monorail. Preferably, an electronically controlled hose carrier system is provided which senses the position of the simulator along the monorail and drives the end of the hose to keep pace with the simulator, thereby eliminating any drag from the hose.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a view of the partial gravity simulator of this invention in operation, with parts of the gimbal system broken away to show the position of the trainee relative to the simulator;

FIG. 2 is an enlarged perspective view of the gimbal system of the simulator;

FIG. 3 is a view showing the trainee in a crawling position and the relative positions of the gimbals in the gimbal system of FIG. 2;

FIG. 12 is a schematic view showing parts of the electronically controlled hose carrier system.

Figure 4:
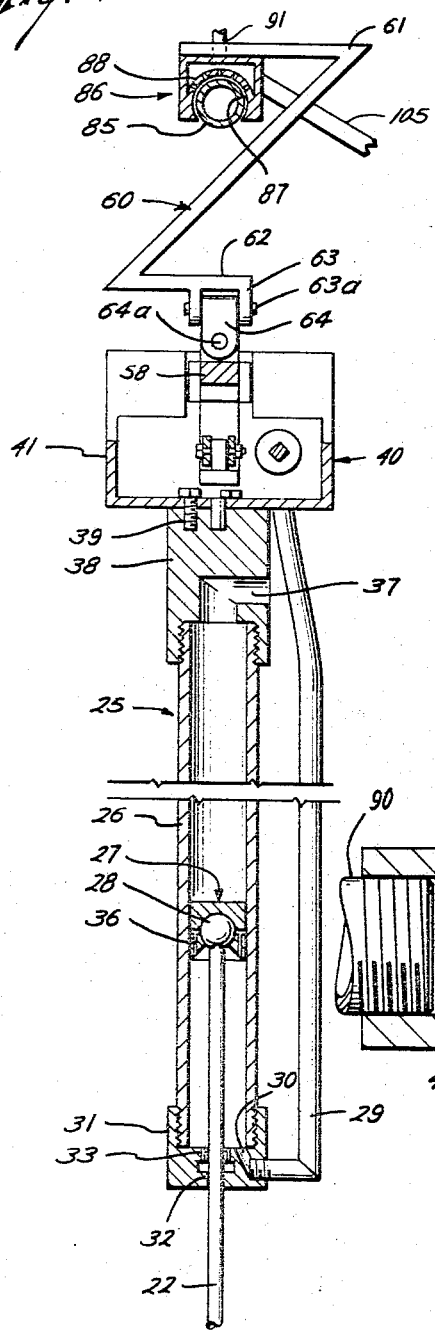
FIG. 4 is a vertical sectional view through the pneumatic piston and cylinder assembly of the simulator looking in the direction of the arrows, as shown in FIG. 1, and showing parts of the pneumatic servo mechanism for controlling piston movement, and the means mounting these components on an overhead monorail.

Referring more particularly to FIG. 1 of the drawings, there is shown a simulator 10 which constitutes one embodiment of the invention. As shown, the trainee is supported in the simulator 10 by a body harness 11 which is carried by a gimbal system 15. The trainee's center of gravity is located at the center of the gimbal system which provides the trainee with three degrees of freedom in attitude as he walks over the simulated lunar surface S. The gimbal system in turn is carried on the lower end of the piston rod 22 of a vertically disposed pneumatic piston and cylinder assembly 25, the cylinder pressure of which is controlled by a pneumatic servo mechanism 40 mounted atop the piston and cylinder assembly. The pneumatic servo controls the flow of high pressure gas to the cylinder from a source of compressed gas to apply an invariant uplifting force on the trainee through controlled pressure on the piston. The pneumatic servo mechanism is suspended from an overhead monorail 85 on an air bearing 86, and compressed air to the pneumatic servo and the air bearing is delivered through pressure hoses 90 and 91, respectively. For the purpose of eliminating drag on the simulator, an electronically controlled hose carrier system 100 is provided which senses the position of the simulator along the monorail and drives the ends of the hoses to keep pace with the simulator as the trainee walks along.

The harness 11 is designed to hold the torso section of the trainee rigid while leaving his arms and legs free. It includes a rigid aluminum alloy back plate 12 which is held against the trainee's back by suitable straps or a broad corset-like support which covers the abdomen and pelvis and attaches to the sides of the back plate. The back plate is of sufficient length so that the trainee's torso section may be strapped thereto over the greater portion of its length so as to be held rigid.

The gimbal system comprises yaw and pitch gimbals 16 and 17, respectively, and a roll gimbal 18 which carries the harness 11. The yaw and pitch gimbals are in the form of half circle members pivotally joined at their diameter ends by the pivots 19 and 20, respectively, as shown in FIG. 2. The roll gimbal is an axially rotatable rod which is secured at one end to the back plate 12 of the harness, and at its other end is journalled to the pitch gimbal 17 at the midpoint of the arc defined by the gimbal 17. The gimbal rod 18 is attached to the back plate such that the axis of the rod extends through the center of gravity of the trainee's body and is comprised of telescopic members 18a and 18b, so that its length is adjustable. Any conventional locking means (not shown) may be provided to hold the rod at a selected length.

The entire gimbal system 15 is suspended from the lower end of the piston rod 22 which is attached to the top of the yaw gimbal member 16 at the midpoint thereof, with its axis directed through the center of the gimbal system. The piston rod is axially rotatable within the cylinder, as will hereinafter be described, whereby the yaw gimbal is rotatable about the axis of the piston rod. Also, since the roll gimbal rod is telescopically adjustable, the center of gravity of the trainee may always be located such that all axes of rotation of the gimbal system will pass through the center of gravity of the trainee's body. It is also preferred that the attachment of the gimbal rod to the harness back plate be adjustable to allow different sized trainees with different centers of gravity to use the simulator without the need for major modification of apparatus. Such adjustability might be achieved by a number of methods such as by providing the back plate with a number of apertures whereby an end flange 21 of the rod 18 might be bolted thereto at a selected location. The gimbal system is otherwise a conventional structure which simplifies the stoitic balance of the gimbal system, the body harness support system, and the crewman, and substantially eliminates interference of structure with the crewman's freedom of motion.

The piston rod 22 of the piston and cylinder assembly is preferably fabricated of steel and the piston 27 of aluminum and brass alloys. The cylinder 26 is of aluminum alloy. As shown in FIG. 4, attachment of the piston rod 22 to the piston is by means of a swivel ball joint 28, whereby the piston rod is axially rotatable. The swivel ball joint also lends limited pivotal capability to the piston rod, so that any binding of the piston in the cylinder as might be caused by flexure of the long cylinder might be avoided. The high pressure gas which drives the piston upward is fed into the lower end of the cylinder through a conduit 29 which delivers compressed gas from the servo mechanism to the bottom end of the cylinder. The conduit 29 communicates with the interior of the cylinder through an orifice 30 provided in the closure member 31 which is in the form of a cap threadedly connected to the lower end of the cylinder. The cap 31 is provided with a central bore 32 for receiving the piston rod 22 therethrough.

The cap 31 is also provided with a plurality of orifices 33 which extend from the inner surface 34 of the cap and open into the wall of the bore 32. The orifices 33 communicate high pressure gas from the cylinder chamber to the bore 32 and thereby form a gas operated bearing which eliminates friction between the piston rod and cylinder. A plurality of flow passages 36 are formed in the piston 27 which extend from the bottom of the piston outwardly to the side wall of the piston. Thus, a small amount of high pressure gas is also bled from the cylinder to form an air bearing between the piston and cylinder and eliminate friction therebetween. Consequently, for all practical purposes the piston movement is frictionless. Furthermore, an outlet 37 is provided in the closure member 38 which is threadedly connected to the top end of the cylinder so that whenever there is piston movement in the cylinder, gas will escape from or enter into the cylinder in accord with the direction of piston movement.

Figure 6:
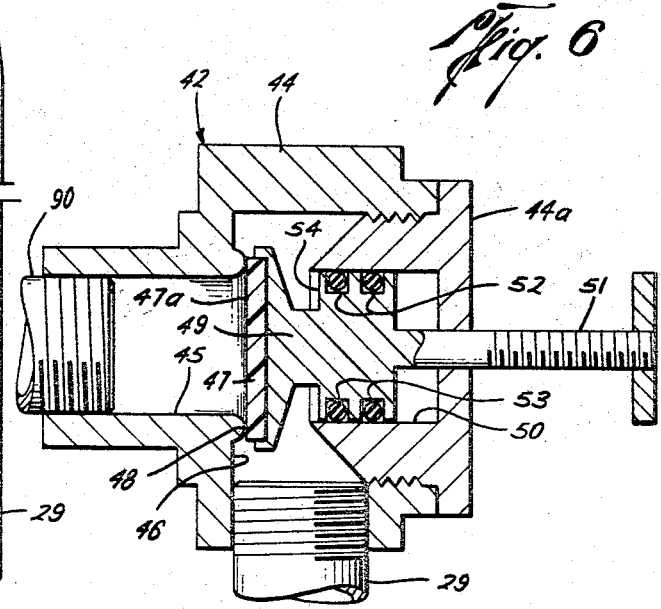
FIG. 6 is a vertical sectional view through one of the spring-loaded poppet valves of the pneumatic servo mechanism shown in FIG. 5.

The pneumatic servo mechanism 40 is mounted atop the cylinder 26 by bolts 39 which bolt the servo housing 41 to the top of the cylinder. The servo mechanism comprises a twin valve arrangement of spring biased poppet valves 42 and 43 which meter the flow of high pressure gas to the cylinder 26. The valve 42, shown in section in FIG. 6, comprises a valve housing 44 having an inlet port 45 and an outlet port 46 with which the air hose 90 and the conduit 29 communicate, respectively. The valve includes a piston valve element 47 having a flat, circular face 47a which seats against the annular seat 48 when the valve is closed. The valve element 47 includes a cylindrical body portion 49 which slides in the bore 50 formed in the right side 44a of the housing, and a piston shaft 51 which slidably extends through an opening in the right side 44a of the valve housing. The cylindrical wall of the portion 49 is provided with a pair of annular grooves 52 which seat piston rings 53. The valve element is also provided with an annular groove to provide a shoulder 54 which constitutes one face of the cylindrical portion 49. The valve element is designed so that the surface area of the annular shoulder 54 is exactly equal to the circular area of the face 47a which is exposed to the air pressure in the conduit 90 when the valve is in its closed condition. Consequently, there is no variation in the force applied by the gas pressure source against the piston valve element when the valve is either closed or open, or at any condition inbetween.

The valve 43 is identical in construction to the valve 42, but is mounted in the servo housing with an orientation which is opposite to that of the valve 42. As shown in the schematic diagram of FIGS. 4 and 5, the inlet port 55 of the valve 43 is connected with the conduit 29 by means of a branch conduit 56 whereby any gas flowing from the outlet of the first valve 42 may be divided in its flow between the conduits 29 and 56.

As will hereinafter be described, the valves are operated so that when one of the valves is all the way open the other is completely closed. To the extent, however, that valve 43 is open, some of the gas from the valve 42 will flow into the valve 43 and be exhausted through its outlet port. When the valve 43 is in a completely closed condition, however, all gas flow through the conduit 56 is shut off and is directed instead to the cylinder 26 by means of the conduit 29.

Figure 8:
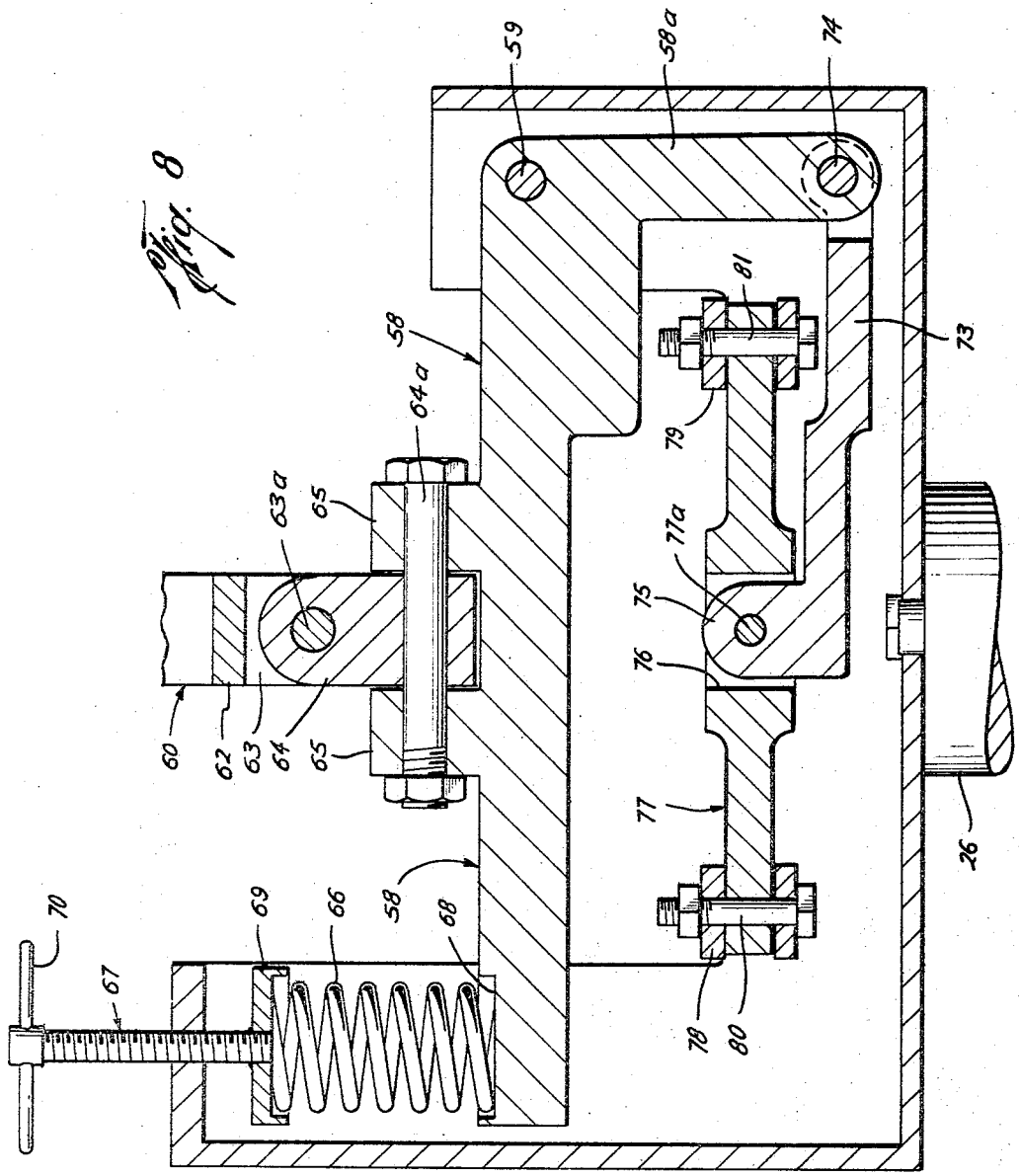
FIG. 8 is a vertical sectional view through the pneumatic servo mechanism looking in the direction of the arrows, as shown in FIG. 7.

The positioning of the valve elements is controlled by a balance scale device which includes a scale beam in the form of an L-shaped bar 58 pivotally mounted in the servo housing by a pivot 59 located at the knee of the L, as best shown in FIG. 8. The servo mechanism is suspended from the monorail 85 by a Z-shaped suspension member 60 which carries the air bearing means 86 on its upper leg 61 and which is attached to the scale beam 58 by its lower leg 62. The leg 62 is provided with downwardly depending ears 63 and a pivot pin 63a is inserted through the ears and a connecting member 64 to provide pivotal movement in the longitudinal direction of the monorail. The connecting member 64 is provided with a pivot pin 64a which is inserted between a pair of ears 65 on the scale beam 58 to connect the Z member for pivotal movement in a plane perpendicular to the scale pivot bar. As shown in FIG. 4, the air bearing is provided between the monorail and the concave cylindrical surface 87 of a plenum chamber 88 which receives high pressure gas from the hose 91 by a suitable connection through the chamber wall. The concave surface 87 is provided with a slightly larger radius of curvature than the monorail 85 and is formed with a number of small perforations 88 through which high pressure gas flows to produce the air bearing between the surface 87 and the monorail.

Figure 9:
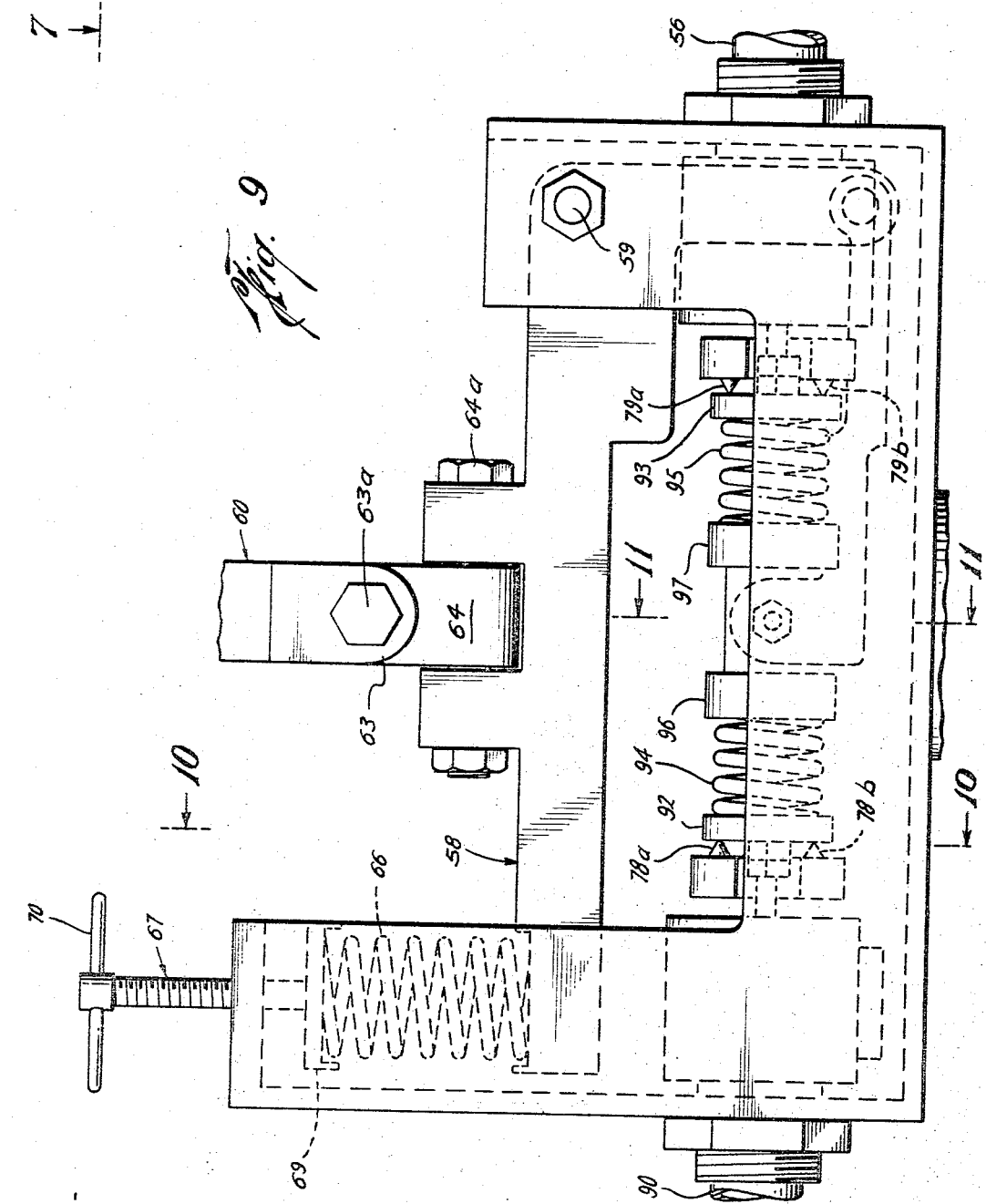
FIG. 9 is a front view of the pneumatic servo mechanism.
Figure 10:
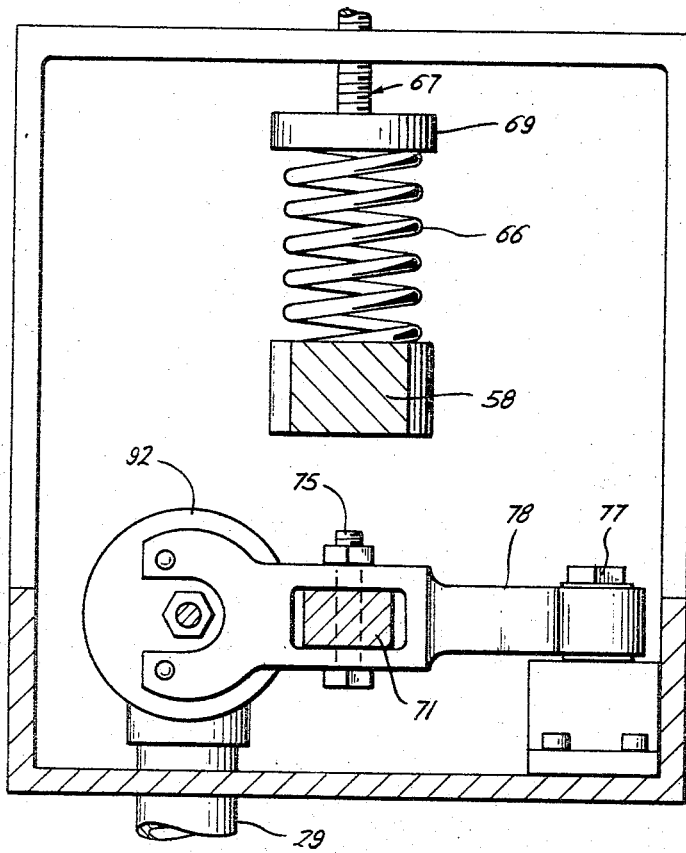
FIG. 10 is a sectional view through the pneumatic servo mechanism looking in the direction of the arrows, as indicated in FIG. 9.
Figure 11:
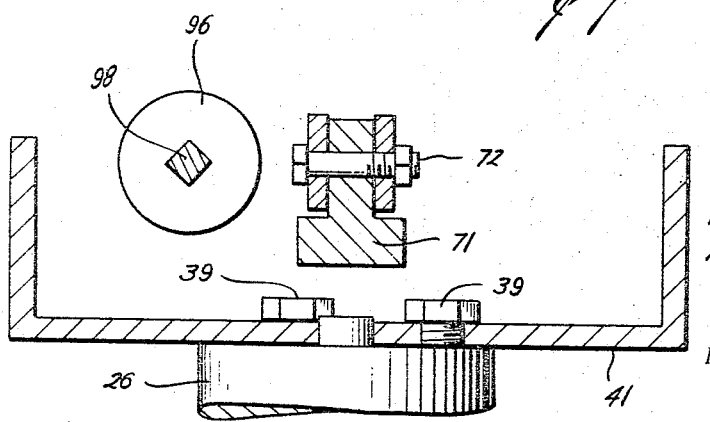
FIG. 11 is a sectional view through the pneumatic servo mechanism looking in the direction of the arrows, as shown in FIG. 9.

As shown in FIGS. 8 and 9, the pivotal scale beam 58 is spring-biased in the counter-clockwise direction by a helical coiled spring 66 which is seated atop the beam 58 adjacent the free end of the beam, and is compressible against the beam by a screw clamp 67 fitted to the top of the servo housing. The bottom end of the spring seats in a circular depression in beam 58, and its upper end seats in a cap 69 at the bottom of the screw clamp. The shaft of the clamp is provided with a handle 70 whereby the clamp may be easily screwed through the top of the servo housing to apply a selected force against the scale beam.

Figure 5:
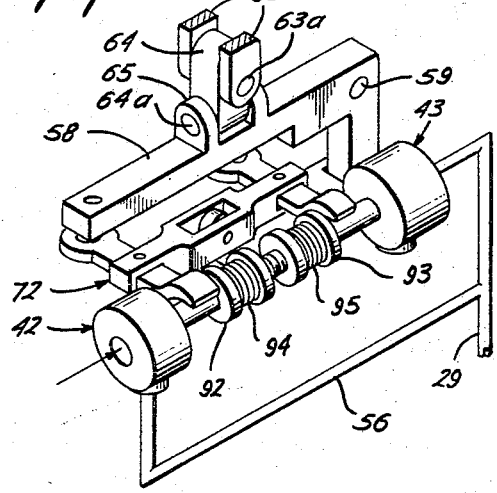
FIG. 5 is a perspective view of part of the pneumatic servo mechanism which controls the flow of compressed gas to the pneumatic cylinder and the exhaustion of gas therefrom.
Figure 7:
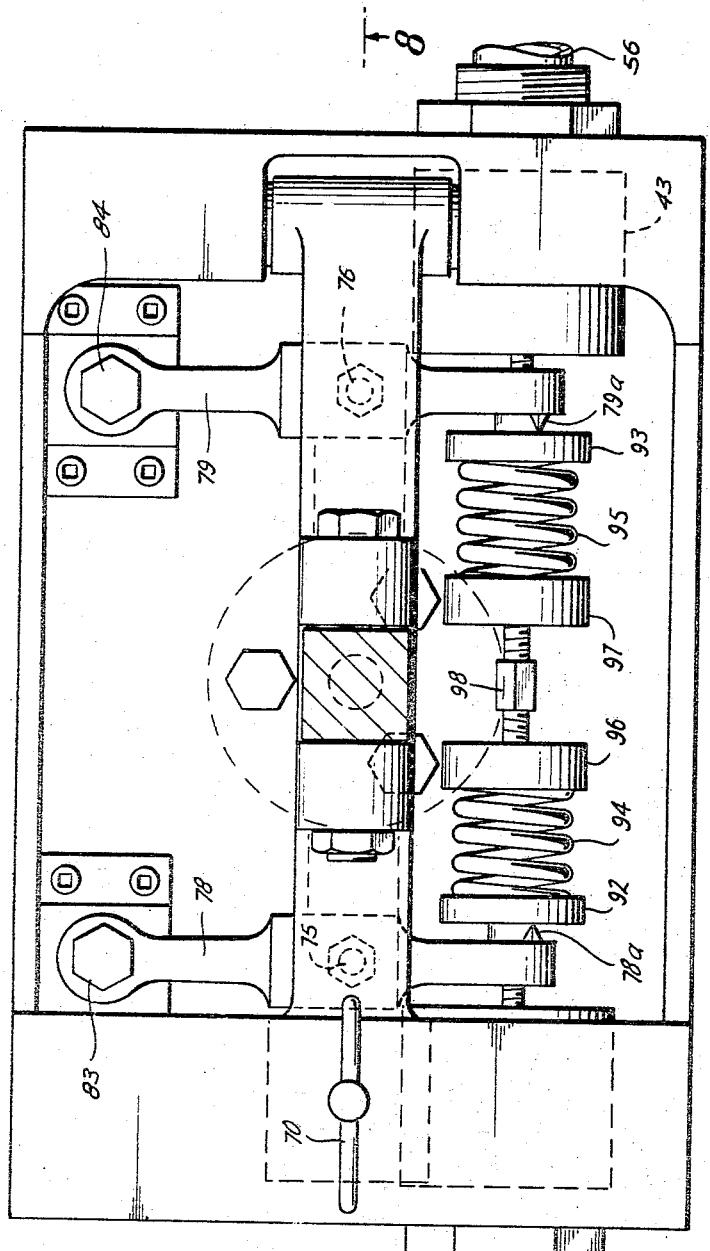
FIG. 7 is a top view of the pneumatic servo mechanism shown in FIG. 9.

Any pivotal movement of the beam 58 is transmitted by a mechanical linkage assembly 72 which positions the valve elements of the valve 42 and 43 to meter the flow of compressed gas to the cylinder 26. As best shown in FIGS. 5 and 7, the mechanical linkage 72 comprises a connecting arm 73 which is pivotally joined at one end to the end of the short leg 58a of the scale beam 58 by a pivot 74. At its other end the connecting arm 73 is provided with an ear 75 which extends into a rectangular opening 76 which is provided in the center of a guide arm 77 and is pivotally connected thereto by the pivot pin 77a. The guide arm 77 is also supported at each of its ends by arms 78 and 79, respectively, by means of pivots 80 and 81, respectively. The arms 78 and 79 are also adapted for pivotal movement in the horizontal plane by means of pivotal connections 83 and 84, respectively, at the rear of the housing. Each of the horizontal pivot arms 78 and 79 is provided with a yoked free end which straddles the shafts of the valve elements of valves 42 and 43 and drivingly engage stop nuts 92 and 93 which are threadedly attached to the ends of the valve elements shafts of the valves 42 and 43, respectively.

The stop nuts 92 and 93 are spring biased against the yoked ends of the arms 78 and 79 by biasing springs 94 and 95. The yoked ends of arms 78 and 79 are each provided with a pair of pointed appendages 78a, 78b and 79a, and 79b, respectively, which engage the stop nuts but reduce friction therebetween. The springs 94 and 95 are helical coiled springs which are coaxially aligned and mounted to act in opposition to one another. Spring seating caps 96 and 97 are attached to the respective ends of an extensible section comprising a screw 98 with oppositely threaded end portions. The spring 94 is seated between the stop 92 and the seating cap 96, and the spring 95 is seated between the stop 93 and the seating cap 97. By turning the screw 98 in a selected direction, the caps 96 and 97 may be moved closer together or further apart to either reduce or increase the biasing force applied by the springs against the stops 92 and 93, as may be desired. The biasing force, however, should always exceed the force applied against a valve element by the high pressure gas to insure proper closing of the valves.

It will therefore be seen that a pivotal movement of the scale beam 58 will be transmitted by the mechanical linkage 72 to cause a pivotal movement of the arms 78 and 79 to either the right or the left, in accordance with the direction of movement of the scale beam. For example, a pivotal movement of the scale beam in the counter-clockwise direction will pivot the arms 78 and 79 to the right, as viewed in FIG. 5, which would result in closing valve 43 and opening valve 42. A pivotal movement of the scale beam in the clockwise direction would cause pivotal movement of the arms 78 and 79 to the left, as viewed in FIG. 5, with the result that the valve elements are moved to open valve 43 and close valve 42. Hence, when one valve is almost completely open, the other is almost completely closed and the degree of closure or opening is dependent on the angular position of the scale beam.

In operation of the device, when the trainee moves downwardly as when kneeling or stepping into a depression in the simulated lunar surface, the piston is pulled downwardly relative to the cylinder, thus tending to pull the cylinder downwardly. The downward pull of the cylinder causes a pivotal movement of the scale beam in the clockwise direction with consequent movement of the valve elements to the left, as shown in FIG. 5. As described above, this movement of the valve elements tends to close inlet valve 42 and open outlet valve 43, thus reducing the metered amount of compressed gas flowing to the cylinder and at the same time permitting more gas in the lower end of the cylinder to be exhausted from the cylinder through the valve 43. The action described is substantially instantaneous, so that the pressure in the lower end of the cylinder is maintained constant and an invariant uplifting force is always applied to the trainee.

In the event the trainee should jump or move upwardly, the piston rod would tend to rise relative to the cylinder, thus tending to reduce the gas pressure in the lower end of the cylinder. As the pressure in the lower end of the cylinder tends to reduce, the cylinder itself tends to rise, thus causing the scale beam to pivot in the counter-clockwise direction with consequent movement of the valve elements to the right. This movement of the valve elements tends to open the inlet valve 42 and to close the outlet valve 43, thus increasing the metered amount of compressed gas flowing to the lower end of the cylinder so as to maintain the cylinder pressure constant. As a result, regardless of movements of the trainee in the vertical direction, either upward or downward, the uplifting force applied to his body is maintained invariant.

It will be noted that the simulator of this invention provides more than five degrees of freedom of motion around the normal body axes. The gimbal system provides three full degrees of freedom in attitude, and the cylinder and monorail provide two additional degrees of freedom in translation. In addition, sidewise pendulum-like motion of the apparatus about the monorail produces some limited degree of freedom in lateral translational movement. The trainee can therefore train himself to walk over the simulated surface and perform tasks thereon under a very real simulation of the condition of lunar gravity. It is possible, of course, to adjust the force applied to the scale beam 58 by turning the screw clamp 67 and therefore adjust the magnitude of the uplifting force which is applied to the trainee's body through the piston rod 22. For example, the condition of zero gravity can be simulated by increasing the spring scale biasing force to where the simulator applies an uplifting force to the trainee's body which is exactly equal to his weight.

Since the simulator is gas operated, the large amounts of gas required are supplied by an off-board gas supply. In order to avoid the problem of drag on the simulator, as might be caused by the air supply hoses, this simulator uses an electronically controlled hose carrier system 100 in the form of a closed loop system which senses the position of the simulator along the monorail and drives the end of the hose to keep pace with the simulator. In lieu of the hose carrier system, however, it would be possible for a person to walk alongside the trainee in the simulator and hand carry the hose along. While this is often a satisfactory means of reducing drag, the automatic system, however, is preferable, and a schematic of such a system is shown in FIG. 12.

The hose carrier system 100 comprises a track 101 placed parallel to the monorail and a carriage 102 with a reversible electric drive motor which rides the track and is adapted for movement thereon in either direction. The track is preferably a rack which is engaged by cogwheels of the carriage. Extending perpendicularly from the carriage to the gas bearing chamber housing 86 on the monorail is an arm 105 which is pivotally attached to the bearing housing and carriage whereby it is adapted to move angularly with respect to the carriage as the simulator moves along the monorail. To allow for pivotal movement, the arm 105 may be made extensible as by fabrication with telescoping parts or else provided with a slide attachment (not shown) to the bearing housing as by a ball joint connection which is slidable in a transverse groove in the bearing housing. A slight angular movement of the arm 105 caused by movement of the bearing housing energizes the motor carriage to move along the track in the direction to eliminate the angular movement, and at a rate proportional to the existing angular change of arm 105.

The system is thus electronically servo-controlled to sense the position of the simulator along the monorail and maintain position with it. The hose 90 is coiled about a self-retracting reel 110 and is also fixedly attached to an eye 111 provided on the motor carriage whereby, as the carriage moves, it pulls the hose along with it and thereby eliminates any drag of the hose on the simulator. There are, of course, other positioning systems similar to the system 100 which could be satisfactorily used for driving the hose along with the simulator.

In one model of the simulator 10 the monorail consists of sections of precision ground steel tubing placed end-to-end to make a rail 60 feet long which is mounted about 50 feet above the simulated lunar surface. Instead of a single gas operated bearing which rides the monorail, two such bearings are provided, and the entire simulator is sustained from the two bearings. The number of such bearings, of course, may be varied as desired. One important alternate embodiment of this invention is a high response full six degrees of freedom partial gravity simulator. In this embodiment the rail and air bearing 86, which in the simulator described above supplies one and one-half degrees of translational freedom, is replaced by an automatically controlled crane system which would give two full degrees of translational freedom by permitting the trainee to walk in any direction instead of being limited to movement in the direction of the monorail. It is also possible (as has been done in one model) to use remote controlled electric motors for controlling the screw clamp 67 to adjust the scale spring biasing force and for turning the screw 98 to adjust the valve springs 94 and 95.

Although this device is admirably suited for simulating partial gravity and for teaching astronaut trainees to walk and to perform under the condition of subgravity, the device can also be used as a therapeutic aid to assist polio patients and other such handicapped persons in exercising their legs and for learning to walk again. Only minor modification of the device, if any, would be necessary to adapt the simulator to such use.

In the fabrication of the simulator it would also be possible to invert the pneumatic piston and cylinder assembly and attach the gimbal system to the cylinder. In this modified form of the simulator, air pressure delivered to the cylinder would cause the cylinder to move upwardly relative to the piston. The operation, of course, is substantially the same as in the simulator described above.

It should therefore be understood that the foregoing disclosure relates only to preferred embodiments of the invention and that it is intended to cover all changes and modifications of the examples of the invention herein chosen for the purposes of the disclosure and which do not constitute departure from the spirit and scope of the invention.

What is claimed and desired to be secured by Letters Patent is:

1. A partial gravity simulator comprising:
   an overhead monorail;
   a scale balance including a scale beam;
   suspension means for hanging said scale beam from the overhead monorail, said suspension means including a suspension member pivotally connected to the scale beam intermediate the ends thereof to provide a fulcrum, said suspension member being supported on said monorail on air bearing means whereby said suspension member is adapted to ride along said monorail on said air bearing means;

a vertically arranged pneumatic cylinder and piston assembly including cylinder and piston members, said piston member having a piston rod slidably extending in a vertical direction through the lower end of said cylinder;

means interconnecting said piston and cylinder assembly with one end of said scale beam whereby said piston and cylinder assembly depends from one end of the scale beam and is pivotally connected thereto;

a spring bias means for applying a counterbalancing force to the other end of said scale beam;

a gimbal system including yaw, pitch, and roll gimbals;

means rigidly securing said gimbal system to the lower end of the piston rod of said piston and cylinder assembly with the yaw axis of the gimbal system disposed vertically;

a body support system secured to said gimbal system for suspending a person in said gimbal system with his center of gravity at the intersection of the respective axes of said gimbals, said piston being movable vertically with respect to the cylinder in accordance with movements in vertical translation of a person suspended in the body support system;

a source of compressed air for supplying air to said cylinder and an uplifting force on said piston member; and valve metering means responsive to the angular position of the scale beam for metering the flow of compressed air into the pressure side of said cylinder to maintain the cylinder pressure invariant, whereby a constant uplifting force is applied to the piston member and said person irrespective of movements of said person beneath the monorail.

2. A partial gravity simulator as described in claim 1, further characterized by means for adjusting the counterbalancing force applied to the scale beam by the spring bias means.

3. A partial gravity simulator as described in claim 1, further characterized by air bearing means provided between the piston member and the cylinder member, and between the piston rod and the cylinder member, to provide for essentially friction-free vertical and rotational movement of the piston member in the cylinder member.

4. A partial gravity simulator as described in claim 1 including conduits interconnecting the source of compressed air with the pressure side of the cylinder and said air bearing means, respectively; and means for sensing the location of the suspension member along the monorail and driving the conduits to maintain relative position with the suspension member as said person moves beneath the monorail, thereby eliminating drag of the conduits on said simulator.

5. A partial gravity simulator comprising:

an overhead support member;

a scale balance including a scale beam;

suspension means for hanging said scale beam from the overhead support member, said suspension means including a suspension member pivotally connected to the scale beam intermediate the ends thereof to provide a fulcrum, said suspension member being supported on said support member on an air bearing means whereby said suspension member is adapted to ride along said support member on said air bearing means;

a vertically arranged pneumatic cylinder and piston assembly including cylinder and piston members, said piston member having a piston rod slidably extending in a vertical direction through the lower end of said cylinder;

means interconnecting said piston and cylinder assembly with one end of said scale beam whereby said piston and cylinder assembly depends from one end of the scale beam and is pivotally connected thereto;

a spring bias means for applying a counterbalancing force to the other end of said scale beam;

a gimbal system including yaw, pitch, and roll gimbals;

means rigidly securing said gimbal system to one of said members of the piston and cylinder assembly with the yaw axis of the gimbal system disposed vertically;

a body support system secured to the gimbal system for suspending a person in the gimbal system with his center of gravity at the intersection of the respective axes of the gimbals, said piston being movable vertically with respect to the cylinder in accordance with movements in vertical translation of a person suspended in the body support system;

a source of compressed air for supplying air to said cylinder and a force on said piston member;

valve metering means responsive to the angular position of the scale beam for metering the flow of compressed air into the pressure side of said cylinder to maintain the cylinder pressure invariant, whereby a constant uplifting force is applied to said one member of the piston and cylinder assembly and to said person irrespective of movements of said persons beneath the monorail, said person being provided with three degrees of freedom in attitude and additional freedoms of movement in vertical and horizontal translation beneath the overhead support member.

6. A partial gravity simulator as described in claim 1, further characterized by means for adjusting the counterbalancing force applied to the scale beam by the spring bias means.

7. A partial gravity simulator comprising:

an overhead monorail disposed substantially horizontal;

a pneumatic cylinder and piston assembly including cylinder and piston members, said piston member having a piston rod slidably extending in a vertical direction through the lower end of said cylinder;

suspension means for suspending said pneumatic cylinder and piston assembly from said overhead monorail, said suspension means including a suspension member and air bearing means supporting the suspension member on said monorail, whereby said pneumatic cylinder and piston assembly is adapted to ride along said monorail on said air bearing means;

means for suspending a person from the lower end of the piston rod of said piston and cylinder assembly; and pneumatic servo means delivering compressed air to said cylinder on the underside of said piston and substantially maintaining said pressure invariant to thereby apply a constant uplifting force on said piston and said person, irrespective of the movements of the person beneath said monorail.

8. A partial gravity simulator comprising:

an overhead monorail disposed substantially horizontal;

a pneumatic cylinder and piston assembly including cylinder and piston members, said piston member having a piston rod slidably extending in a vertical direction through the lower end of said cylinder;

suspension means for suspending said pneumatic cylinder and piston assembly from said overhead monorail, said suspension means including a suspension member supported by air bearing means on said monorail whereby said pneumatic cylinder and piston assembly is adapted to ride along said monorail on said air bearing means;

means for suspending a person from the lower end of the piston rod of said piston and cylinder assembly;

pneumatic servo means delivering compressed air to said cylinder on the underside of said piston and substantially maintaining said pressure invariant, to thereby apply a constant uplifting force on the piston and said person irrespective of the movements of said person beneath the monorail; and means for selectively adjusting the magnitude of the pressure which is maintained invariant against said piston and thereby adjusting the uplifting force which is constantly applied to said person to simulate different gravitational forces acting on said person.

9. A partial gravity simulator comprising:

a gimbal system including yaw, pitch, and roll gimbals;

a body support system secured to said gimbal system for supporting a person in said gimbal system with his center of gravity at the intersection of the respective axes of said gimbals;

a vertically arranged pneumatic cylinder and piston assembly including cylinder and piston members, said piston member having a piston rod slidably extending in a vertical direction through the lower end of said cylinder;

means rigidly securing said gimbal system to the lower end of the piston rod of said piston and cylinder assembly with the longitudinal axis of said piston rod coincident with the yaw axis of the gimbal system;

an overhead monorail disposed substantially horizontal;

suspension means for suspending said pneumatic cylinder and piston assembly from said overhead monorail, said suspension means including a suspension member and air bearing means for supporting said suspension member on said monorail, whereby said suspension member is adapted to ride along said monorail on said air bearing means; and pneumatic servo means for delivering compressed air to said cylinder on the underside of said piston member and substantially maintaining said pressure invariant to thereby apply a constant uplifting force on said piston member and said person through the gimballed body support system irrespective of movements of said person beneath said monorail which have vertical translational components.

10. A partial gravity simulator as described in claim 9 including means for selectively adjusting the magnitude of the constant uplifting force applied against said piston member and said person.

11. A partial gravity simulator comprising:

a gimbal system including yaw, pitch, and roll gimbals;

a body support system attached to said gimbal system for securing a person in said gimbal system with his center of gravity at the intersection of the respective axes of said gimbals;

a pneumatic cylinder and piston assembly including cylinder and piston members, said piston member having a piston rod slidably extending in a vertical direction through one end of said cylinder;

means rigidly securing said gimbal system to one of the members of said piston and cylinder assembly with the yaw axis of the gimbal system disposed in the vertical direction;

an overhead monorail;

means suspending said pneumatic cylinder and piston assembly from said overhead monorail, whereby said pneumatic cylinder and piston assembly is adapted to ride with frictionless movement along said monorail; and pneumatic servo means for delivering compressed air to said cylinder and air pressure against said piston and maintaining said pressure invariant to apply a constant uplifting force on said one member which secures the gimballed body support system, said constant uplifting force being applied irrespective of movements of said person beneath said monorail and reducing the apparent weight of said person so as to simulate a low gravitational field.

12. A partial gravity simulator as described in claim 11 including means for selectively adjusting the pressure which is maintained invariant against said piston member and thereby selectively adjusting the magnitude of the uplifting force which is applied to the body of said person through said one member of the pneumatic piston and cylinder assembly which is secured to the gimballed body support system.

13. A partial gravity simulator comprising:

an overhead monorail disposed substantially horizontal;

a pneumatic cylinder and piston assembly including cylinder and piston members, said piston member having a piston rod slidably extending through one end of said cylinder;

suspension means for suspending said pneumatic cylinder and piston assembly from said overhead monorail, said suspension means including a suspension member and air bearing means for supporting said suspension member on said monorail, whereby said suspension member is adapted to ride along said monorail on said air bearing means;

means for suspending a person from one of said cylinder and piston members; and pneumatic servo means for delivering compressed air to said cylinder to pressurize said piston and substantially maintaining said pressure invariant to thereby apply a constant uplifting force on said one of said cylinder and piston members and said person, irrespective of the movements of the person in vertical and horizontal translation beneath the monorail.

14. A partial gravity simulator comprising:

an overhead monorail disposed substantially horizontal;

a vertically arranged pneumatic cylinder and piston assembly including cylinder and piston members, said piston member having a piston rod slidably extending in a vertical direction through one end of said cylinder;

suspension means for suspending said pneumatic cylinder and piston assembly from said overhead monorail, said suspension means including a suspension member and air bearing means for supporting said suspension member on said monorail whereby said suspension member is adapted to ride along said monorail on said air bearing means;

means for suspending a person from one of said cylinder and piston members;

pneumatic servo means for delivering compressed air to said cylinder to pressurize said piston member and substantially maintaining said pressure invariant to thereby apply a constant uplifting force on said one of said cylinder and piston members and said person irrespective of the movements of the person in vertical and horizontal translation beneath the monorail; and means for selectively adjusting the magnitude of the pressure which is maintained invariant against said piston member and thereby adjusting the uplifting force which is constantly applied to said person to simulate different gravitational fields acting on said person.

15. A partial gravity simulator comprising:

an overhead support member;

a cylinder and piston assembly including a piston rod slidably extending through one end of said cylinder;

means suspending said cylinder and piston assembly from said overhead support member whereby the cylinder and piston assembly is adapted to ride along said overhead support member;

means for suspending a person from one of the members of the piston and cylinder assembly; and means for delivering fluid under pressure to said cylinder to pressurize said piston and for substantially maintaining said pressure invariant to apply a constant uplifting force on said one member of the piston and cylinder assembly and said person, irrespective of the movements of said person beneath the overhead support member.

16. A device for simulating partial gravity or zero gravity comprising:
  a gimbal system including yaw, pitch, and roll gimbals;
  a body support system secured to said gimbal system for supporting a person with his center of gravity at the intersection of the respective axes of said gimbals; and
  means attached to the gimbal system for applying a constant uplifting force to the gimbal system and a person supported thereon, said force acting through the intersection of the gimbal axes and being substantially unaffected by existing air currents.

References Cited

UNITED STATES PATENTS

| | | | |
|---|---|---|---|
| 3,161,968 | 12/1964 | De Boy et al. | 35—12 |
| 3,252,704 | 5/1966 | Wilson | 272—70.3 |

EUGENE R. CAPOZIO, *Primary Examiner.*

H. S. SKOGQUIST, *Assistant Examiner.*